United States Patent [19]

Gaborski

[11] Patent Number: 5,054,102

[45] Date of Patent: Oct. 1, 1991

[54] SELF-CENTERING CHARACTER STROKE THICKENING FOR OPTICAL CHARACTER RECOGNITION

[75] Inventor: Roger S. Gaborski, Pittsford, N.Y.

[73] Assignee: Eastman Kodak Company, Rochester, N.Y.

[21] Appl. No.: 536,125

[22] Filed: Jun. 11, 1990

[51] Int. Cl.[5] ............................................. G06K 9/46
[52] U.S. Cl. ........................................ 382/54; 382/55
[58] Field of Search ............................. 382/22, 54, 55

[56] References Cited

U.S. PATENT DOCUMENTS 4,010,446  3/1977  Kawa ................................... 382/55
4,581,762  4/1986  Lapidus et al. ...................... 382/22
4,924,521 12/1987  Dinan et al. ......................... 382/54

Primary Examiner—Stephen Brinich
Attorney, Agent, or Firm—Dennis R. Arndt

[57] ABSTRACT

In an optical character recognition system, character strokes are automatically enhanced prior to processing by matching the character bit map with a set of templates. Each template has a stripe of thickness W composed of binary ones surrounded by zeroes along a horizontal, vertical, major diagonal or minor diagonal direction. If the template matches a character stroke to a predetermined degree, the stroke is enhanced by increasing its thickness to a predetermined number N of binary ones.

20 Claims, 4 Drawing Sheets

| POSITION | SCORE |
|---|---|
| 1 | 0 |
| 2 | -5 |
| 3 | -5 |
| 4 | +5 |
| 5 | -5 |
| 6 | -5 |
| 7 | 0 |

| POSITION | SCALE |
|---|---|
| 1 | 0 |
| 2 | -5 |
| 3 | -10 |
| 4 | -5 |
| 5 | -5 |
| 6 | -5 |
| 7 | 0 |

| POSITION | SCALE |
|---|---|
| 1 | 0 |
| 2 | -5 |
| 3 | +5 |
| 4 | +5 |
| 5 | -5 |
| 6 | -5 |
| 7 | 0 |

| POSITION | SCORE |
|---|---|
| 1 | 0 |
| 2 | −5 |
| 3 | 0 |
| 4 | +10 |
| 5 | 0 |
| 6 | −10 |
| 7 | 0 |

| POSITION | SCALE |
|---|---|
| 1 | −5 |
| 2 | −9 |
| 3 | 0 |
| 4 | −2 |
| 5 | −8 |
| 6 | −5 |

SELF-CENTERING CHARACTER STROKE THICKENING FOR OPTICAL CHARACTER RECOGNITION

BACKGROUND OF THE INVENTION

1. Technical Field

The invention is related to optical character recognition (OCR) systems and in particular to image pre-processing with template matching to enhance or strengthen weak or poor quality images of printed or hand-written characters.

2. Background Art

In optical character recognition systems, scanning a document using a scanner resolution of about 400 dots per inch typically yields bit maps of character images which have consistently strong character strokes of at least two pixels in width. Such bit map images are readily processed by the optical character recognition system. The document may be scanned more quickly if the scanning resolution is reduced to 200 dots per inch. However, it has been found that at this reduced resolution, the quality of the character image bit map is reduced because many character strokes are found having only a one-pixel width. Such thin character strokes in the presence of thicker character strokes often prevent the optical character recognition system from recognizing the character image.

In the invention, poor quality character image bit maps, such as those obtained by scanning with a resolution of only 200 dots per inch, are pre-processed using template matching to detect and thicken any weak or thin character strokes. The enhanced character image bit maps thus produced by the pre-processor of the invention are readily recognized by the optical character recognition system.

Pre-processing a document image with template matching for optical character recognition is well-known in the art. For example, U.S. Pat. No. 3,624,606 (Lefevre) discloses the concept of matching the character bit map with a set of templates, each template containing a stripe corresponding to a horizontal line image, a vertical line image, a major diagonal line image and a minor diagonal line image. However, this reference does not disclose thickening a matching character stroke in the image. Instead, it teaches matching both black and white striped templates with the image for the purpose of lengthening any matching stripe in the bit map image, be it black or white (i.e., whether it is a character stroke or a space between adjacent character strokes). Thus, this reference appears to have nothing to do with the thickening or strengthening of character strokes.

U.S. Pat. No. 4,791,679 (Barski et al.) discloses an optical character recognition system which strengthens the strokes of individual characters as needed by grouping the pixels in a grid of squares and converting various ones of the squares or diagonal halves thereof to all binary ones in accordance with a set of rules. The rules essentially respond to a correlation between each kernel of the image and vertical, horizontal or diagonal lines. The disadvantage of this approach with respect to that of the present invention is that the placement of the grid in the image is arbitrary, so that the strengthened strokes will not necessarily be centered with respect to original character strokes. In contrast, the present invention automatically centers each strengthened character stroke with respect to the original character stroke.

U.S. Pat. No. 4,124,870 (Schatz et al.) and U.S. Pat. No. 3,573,789 (Sharp) both disclose systems for increasing the resolution of an image by techniques related to interpolation between the pixels of the original coarse resolution image to generate the additional pixels required for the processed fine resolution image.

In summary, there appears to be no technique in the art for strengthening—thickening—a weak character stroke in such a manner that the thickened character stroke is automatically centered with respect to the original weak character stroke. In fact, it would appear that the known techniques are liable to create a thickened character stroke in lieu of a weak stroke which, at least in some cases, is slightly off-center (or laterally displaced) with respect to other strokes in the image which did not need strengthening and which were therefore unchanged.

It is therefore an object of the invention to strengthen a weak character stroke in a bit-map image of an unknown character so that the resulting thicker character stroke is automatically centered with respect to the original weak character stroke.

DISCLOSURE OF THE INVENTION

In an optical character recognition system, character strokes are automatically enhanced prior to processing by matching the character bit map with a set of templates. For processing bi-tonal images, each template has a stripe of thickness W composed of binary ones surrounded by negative ones. Each template's stripe lies along either a horizontal, vertical, major diagonal or minor diagonal direction. If one of the templates matches a character stroke to a predetermined degree, the stroke is enhanced by increasing its thickness to a predetermined number N of binary ones. If the character stroke thickness already exceeds W by a predetermined amount, the template will not match and the stroke thickness is not increased. The template stripe thickness W, the degree of match, the size of the field of negative ones in the template and the predetermined number N of ones to which the stroke thickness is increased are all adjustable parameters.

BRIEF DESCRIPTION OF THE DRAWINGS

The invention is described below in detail with reference to the accompanying drawings, of which:

FIGS. 1a, 1b, 1c and 1d are diagrams illustrating four types of templates employed in the invention;

FIGS. 2a and 2b illustrate, respectively, an exemplary portion of a bit-map character image and a table illustrating match scores between the template of FIG. 1d and bit map of FIG. 2a;

FIGS. 3a and 3b illustrate, respectively, an exemplary portion of a bit-map character image and a table illustrating match scores between the template of FIG. 1d and bit map of FIG. 3a;

FIG. 4 illustrates a modified version of the template of FIG. 1d;

FIG. 5 is a table illustrating match scores between the template of FIG. 4 and the bit-map of FIG. 2a;

FIGS. 6a and 6b illustrate, respectively, an exemplary portion of a bit-map character image and a table illustrating match scores between the template of FIG. 4 and bit map of FIG. 6a;

FIG.'S 7a, 7b, 7c and 7d illustrate, respectively, an exemplary portion of a bit-map character image (FIG.

Figures 1A, 1B, 1C, 1D, 2B, 3A, 3B, 4, 5:
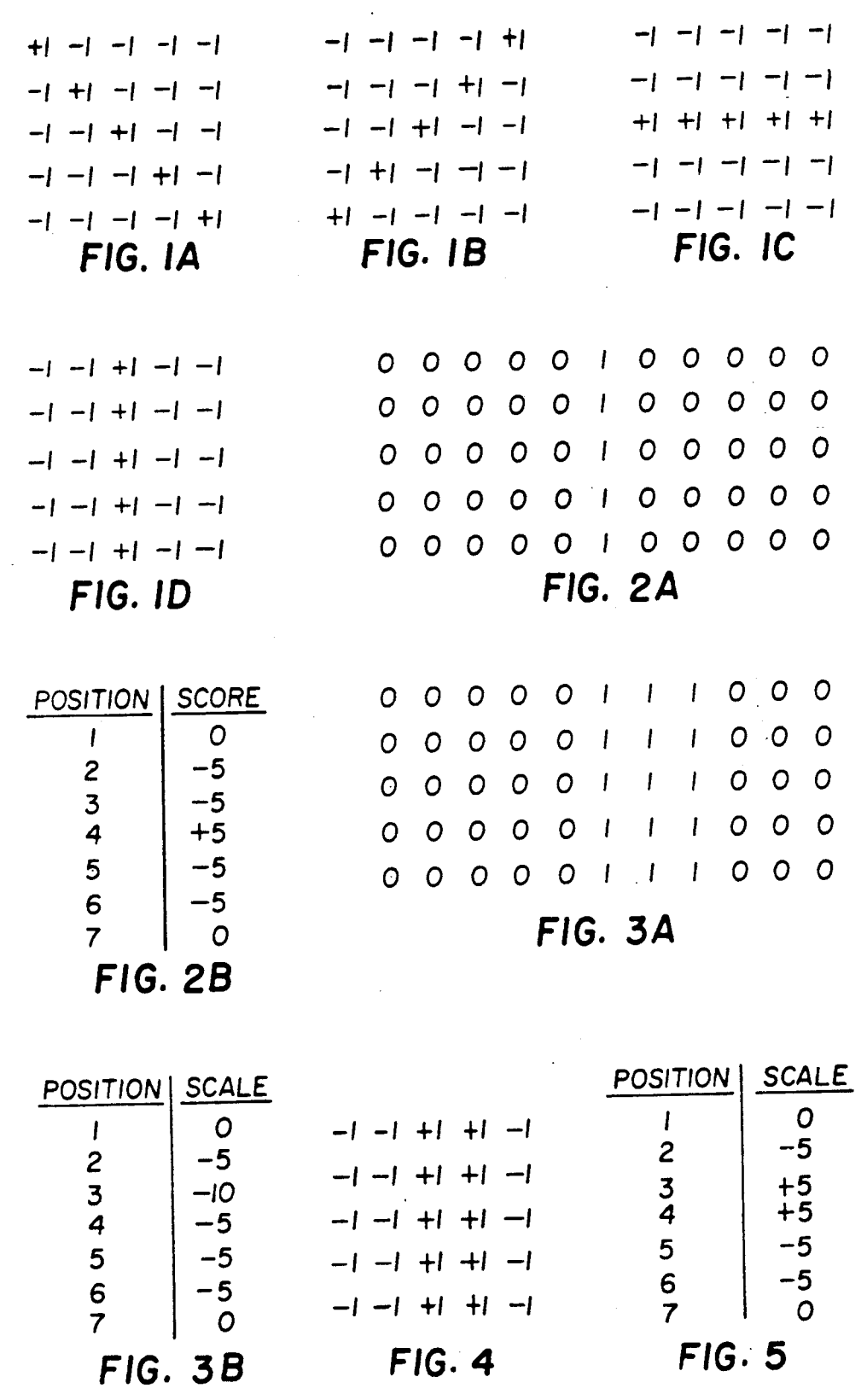
Figure 8:
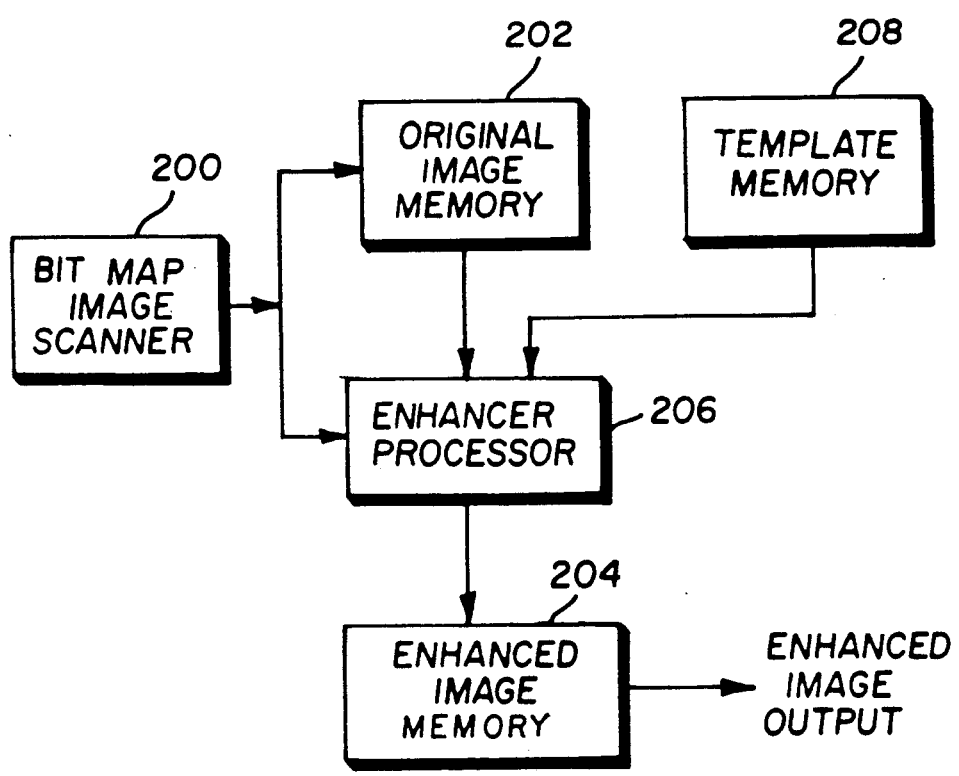

7a), a table illustrating match scores between the template of FIG. 1d and bit map of FIG. 7a (FIG. 7b), a to be changed to strengthen the character (FIG. 7c) and the final thickened character image (FIG. 7d);

FIG. 8 is a simplified block diagram of a system embodying the invention; and

Figure 9:
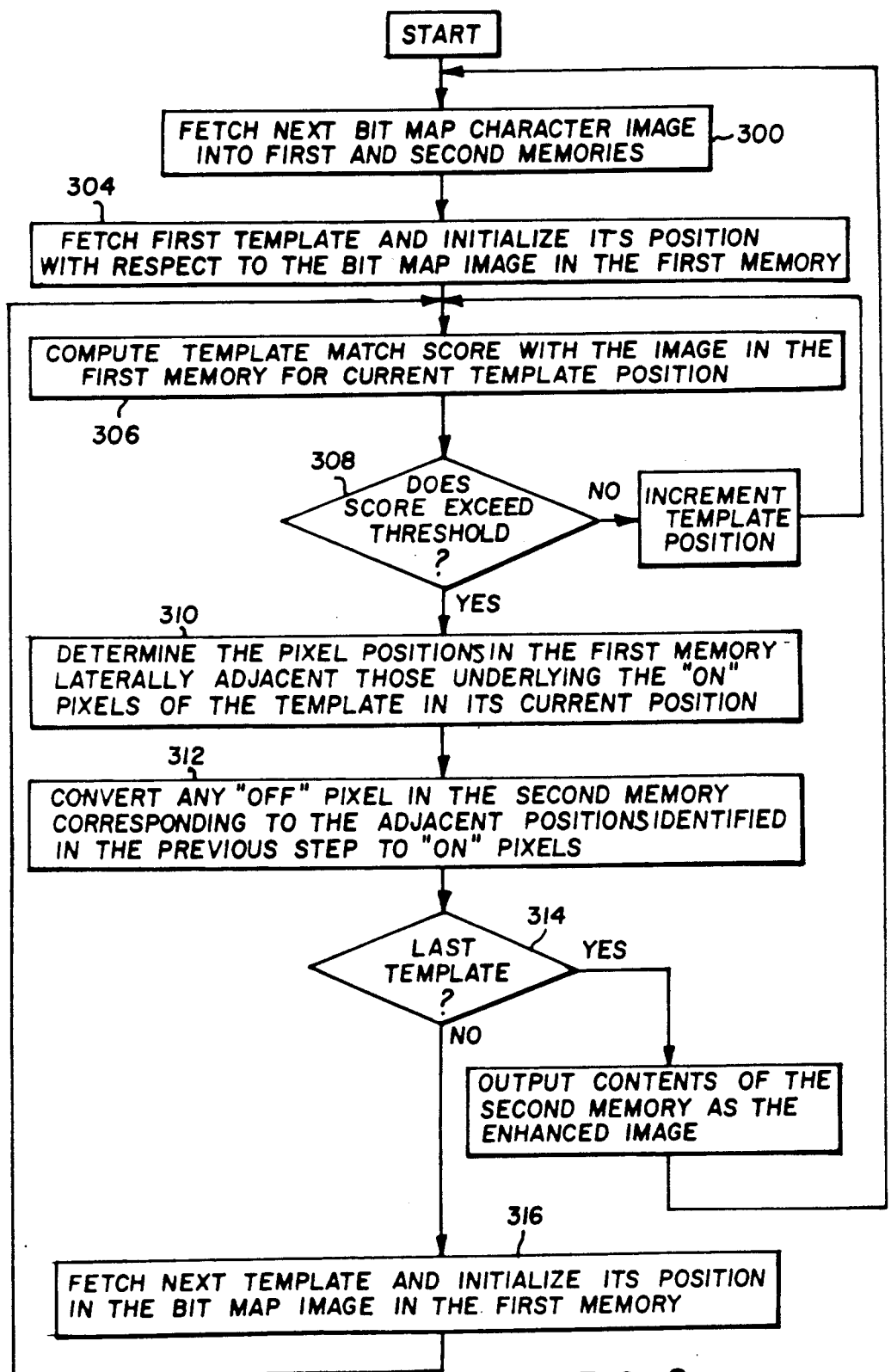

FIG. 9 is a flow diagram illustrating the operation of the system of FIG. 8.

MODES FOR CARRYING OUT THE INVENTION

FIG.'S 1a-1d illustrate a set of exemplary templates employed by the invention to detect weak character strokes to be thickened in a bi-tonal document image. These templates consist of a field of negative ones and a linear stripe of positive ones in the field. The stripes lie along major diagonal, minor diagonal, horizontal and vertical directions in FIGS. 1a-1d, respectively.

If these templates are each matched with the bit-map image of FIG. 2a, only the vertical stripe template of FIG. 1d will produce a matching score. An example of the template matching process is as follows. The 5-by-5 pixel vertical stripe template of FIG. 1d is first aligned with the left-most 5-by-5 group of pixels in the bit-map image of FIG. 2a and is then stepped across the image one pixel at a time from left to right. At each step of the template, the sum of the products of each image pixel with a corresponding (overlying) template element produces the scores tabulated in FIG. 2b.

Computation of a score at each position in the image to which the template is stepped is performed as follows. The 5-by-5 template of FIG. 1d has 25 elements which may be designated $T_{ij}$. T is the value of an individual template element (either +1 or −1) while the subscripts i and j denote the row and column position, respectively, in the template. The subscripts i and j each range in value from 1 through 5. At each one of the positions to which the template is stepped in the image of FIG. 2a, the template overlies a different 5-by-5 pixel kernel of the image containing 25 pixels which may be designated $P_{ij}$. At each position, a score S is computed as follows:

$$S = \sum_{i=1}^{5} \sum_{j=1}^{5} T_{ij} P_{ij}$$

At nearly all of the steps, the large number of negative ones in the template produces a negative score. However, at the fourth step of the template of FIG. 1d in the image of FIG. 2a, the vertical stripe of positive ones in the template is aligned with the vertical stripe of ones in the image, producing the only positive score in the table of FIG. 2b. This positive score indicates the position of a one-pixel wide vertical character stroke. Having thus located such a character stroke, the invention then symmetrically widens the stroke by a predetermined number of pixels on both sides of the stroke.

Such a process prevents character strokes which are already sufficiently thick from being thickened even more. For example, the bit-map image of FIG. 3a contains a 3-pixel wide vertical character stroke. Stepping the template of FIG. 1d from left to right across the image of FIG. 3a produces the set of scores tabulated in FIG. 3b, none of which is greater than negative 5. Even if the minimum threshold score at which a "match" is declared is set to zero, all of the scores of FIG. 3b are too low, and no match is found for the image of FIG. 3a and therefore no stroke thickening is performed. Thus, as a general rule, the width of the template stripe determines a maximum character stroke thickness above which the invention will not thicken the character stroke. This feature of the invention prevents character strokes which are already thick in the original image from being over-thickened, a significant advantage.

FIG. 4 illustrates a template corresponding to that of FIG. 1d except that the stripe thickness has been increased to two pixels. Stepping the template of FIG. 4 left to right across the bit-map image of FIG. 2a produces the set of scores tabulated in FIG. 5. A positive score is generated at both the third and fourth positions of the template, producing some ambiguity regarding the true position of the vertical character stroke in the bit-map image. In this case, the ambiguity is resolved by noting that in the steps at which a positive score is noted in FIG. 5, the common position of the two one-pixel columns of +1's of the template of FIG. 4 is the sixth column of the bit-map image of FIG. 2a. From this, the correct conclusion is drawn that a one-pixel wide vertical character stroke has been located in the sixth column of the image of FIG. 2a.

Stepping the template of FIG. 4 across an image such as that of FIG. 6a having a wider character stroke produces more definitive results, as illustrated in the table of FIG. 6b. Stepping the template from left to right, FIG. 6b indicates that the only positive score is obtained at the fourth position of the template.

A more complex (and therefore more realistic) example is the bit-map image of FIG. 7a. Stepping the set of templates of FIGS. 1a-1d through this image results in only the template of FIG. 1d finding a match. Stepping the vertical stripe template of FIG. 1d left to right across the image of FIG. 7a produces the scores tabulated in FIG. 7b. Preferably, the minimum threshold score for declaring a match is set to zero. The only score not less than zero is obtained at the third step or position of the template in the image, indicating the precise location of a weak (one pixel wide) vertical character stroke. The next step is to locate any zero pixels in the bi-tonal image of FIG. 7a which are laterally adjacent either side (right or left) of the weak vertical character stroke which has been detected. This step is depicted in FIG. 7c, in which the zero-valued pixels laterally adjacent the detected weak character stroke are indicated by rectangles. If the indicated pixels are all converted to +1's, the image of a strengthened character stroke is produced as illustrated in FIG. 7d.

One significant advantage of the invention is apparent by comparing the images of FIGS. 7a and 7d. The original image of FIG. 7a appears to have a corner 100 joining two dashed lines 102, 104 depicting the center of a stroke represented by the binary data of the image. The invention scrupulously avoids deforming the corner 100 while strengthening the vertical character stroke. Specifically, the zero-valued pixel 106 in the original image of FIG. 7a is unchanged in the final image of FIG. 7d. This feature is the result of the presence of a field of −1's in each template surrounding the stripe of +1's. It is this feature which provides the accurate detection of each weak character stroke in an image and prevents widening this stroke beyond a predetermined extent. In the example of FIGS. 7a14 7d, this extent is one pixel on both sides of a weak character stroke.

From the foregoing examples, it is seen that a proper selection of the minimum or threshold score at which a match is declared depends upon the size of the template as well as the width of the template's stripe of +1's. It is also affected by the length of the stripe. (In all of the foregoing examples, the stripe length equaled the template length.) The threshold would also change if the value of the background template pixels is changed from −1 to another value or if the stripe pixels are changed from +1 to another value. The template stripe pixel values are greater than the template background pixel values and preferably the template background pixel values are all equal to a negative number. In the example of FIG. 7a, it would appear that the minimum threshold score for declaring a match should be zero for the template set of FIGS. 1a–1d.

A system embodying the invention is illustrated in FIG. 8. A binary bit map image (comprising zeroes and ones) is generated by a scanner 200 and stored in an original image memory 202 as well as in an enhanced image memory 204. An image enhancement processor 206 searches for a match between the original image in the memory 202 and the first one of a set of templates (such as the templates of FIGS. 1a–1d) stored in a template memory 208 by stepping the template through the image in the manner described previously herein. If a match is found, the processor 206 determines which one of the pixels in the image are to be converted from zeroes to ones. This conversion is performed by changing the image stored in the enhanced image memory 204, leaving the image in the memory 202 unchanged. The processor 206 repeats the foregoing process with the next one of the templates stored in the template memory 208 and changes the contents of the enhanced image memory 204 appropriately. The foregoing process is repeated until all of the templates stored in the template memory 208 have been compared with the image. At this point, the contents of the enhanced image memory 204 reflect the results of comparisons of the original image in the memory 202 with all of the templates in the memory 208. The image in the enhanced image memory 204 is now ready for optical character recognition.

The operation of the system of FIG. 8 is illustrated in FIG. 9. A bit-map character image is loaded into the memories 202 and 204 (block 300 of FIG. 9). The first template is fetched from the template memory 208 and set at a first position with respect to the image in the memory 202 (block 304 of FIG. 9). For example, in this step, the upper left corner of the template is aligned with the upper left corner of the image. The match score is then computed by multiplying the value of each pixel element in the template by the value of the corresponding pixel in the image and adding all of the resulting products together (block 306). If the score is less than the threshold (NO branch of block 308), the template is stepped to the next position in the image (block 310) and the foregoing steps beginning at block 306 are repeated. If the score is at least equal to the threshold, a match is declared (YES branch of block 308) and the processor 206 determines from the configuration of the template and its current position with respect to the image in the memory 202 the location of the character stroke in the image. From this, the processor 206 determines the locations of the image pixels which are laterally adjacent either side of the detected stroke (block 310 of FIG. 9). The processor 206 then converts any zero-valued pixels in the same laterally adjacent positions in the memory 204 to one-valued pixels (block 312). If the current template is not the last template in the template memory 208 (NO branch of block 314), the next template is fetched and initialized at the same starting position (block 316) and the foregoing process repeated. Otherwise (NO branch of block 314), the stroke strengthening process is complete and the contents of the enhanced image memory 204 are ready for optical character recognition.

INDUSTRIAL APPLICABILITY AND ADVANTAGES

The invention is useful in optical character recognition pre-processing for thickening weak strokes of unknown characters to enable such characters to be recognized by an optical character recognition system. An advantage of the invention is that the thickened character strokes are centered with respect to the original character strokes.

While the invention has been described in detail by specific reference to preferred embodiments thereof, it is understood that variations and modifications may be made without departing from the true spirit and scope of the invention.

What is claimed is:

1. A character image pre-processor which locates and widens thin character strokes in a character image comprising an array of columns and rows of pixels, said pixels characterized by individual values, said values lying within a range including a relatively high ON value and a relatively low OFF value, said pre-processor comprising:

template memory means for storing a set of n templates comprising an array of M columns and N rows of elements, each template comprising a stripe of width W of high-valued individual template elements in a field of low-valued template elements, the stripe in each of said n templates oriented in a corresponding one of n directions;

template matching means for summing the products obtained from multiplying pixels of a successive one of a set of M column-by-N row kernels of said image by corresponding elements of a successive one of said templates;

stroke strengthening means responsive whenever said means for summing obtains a sum greater than a threshold value for raising toward said On value the values of pixels of said character image in said one kernel which are laterally adjacent a line of pixel locations corresponding to the high-valued elements in the stripe of said one template.

2. The pre-processor of claim 1 wherein said means for raising said pixel values raises values of pixels laterally adjacent each side of said pixel locations corresponding to said stripe whereby to generate a widened character stroke centered with respect to a corresponding original character stroke.

3. The pre-processor of claim 1 wherein n=4 and said directions are vertical, horizontal, major diagonal and minor diagonal.

4. The pre-processor of claim 1 wherein said document image is a bi-tonal bit map in which the value of each of said image pixels is either "ON" or "OFF", and wherein said high valued template elements are positive and said low valued template elements are negative.

5. The pre-processor of claim 4 wherein said ON and OFF image pixels have +1 and 0 binary values, respectively, and wherein the values of said high and low value template elements are +1 and −1, respectively, and wherein said stroke strengthening means comprises means for changing any of said laterally adjacent image pixels whose value is 0 to a value of 1.

6. The pre-processor of claim 1 further comprising an original image memory and an enhanced image memory, both said original and enhanced image memories initially containing the same character image, wherein:
    said template matching means comprises means for matching successive ones of said templates with the image stored in said original image memory; and
    said stroke strengthening means comprises means for increasing the values of said laterally adjacent pixels in said enhanced memory, whereby each template is matched with the original unchanged version of said image, while all changes are made in said enhanced image memory.

7. A character image pre-processing method for locating and widening thin character strokes in a character image comprising an array of columns and rows of pixels, said pixels characterized by individual values, said values lying within a range including a relatively high ON value and a relatively low OFF value, said method employing a set of n templates comprising an array of M columns and N rows of elements, each template comprising a stripe of width W of high-valued individual template elements in a field of low-valued template elements, the stripe in each of said n templates oriented in a corresponding one of n directions, said method comprising:
    (a) for individual ones of a set of M pixels column-by-N pixel row kernels of said image and for a successive one of said templates, summing the products obtained from multiplying pixels of the one kernel by corresponding elements of the one template; and
    (b) whenever the summing step obtains a sum greater than a threshold value, raising toward said ON value the values of pixels of said character image in said one kernel which are laterally adjacent a line of pixel locations corresponding to the high valued elements in the stripe of said one template.

8. The pre-processing method of claim 7 wherein said strengthening step raises value of pixels laterally adjacent each side of said pixel locations corresponding to said stripe whereby to generate a widened character stroke centered with respect to a corresponding original character stroke.

9. The pre-processing method of claim 7 wherein n=4 and said directions are vertical, horizontal, major diagonal and minor diagonal.

10. The pre-processing method of claim 7 wherein said document image is a bi-tonal bit map in which the value of each of said image pixels is either "ON" or "OFF", and wherein said high valued template elements are positive and said low valued template elements are negative.

11. The pre-processing method of claim 10 wherein said ON and OFF image pixels have +1 and 0 binary values, respectively, and wherein the values of said high and low value template elements are +1 and −1, respectively, and wherein said stroke strengthening step comprises changing any of said laterally adjacent image pixels whose value is 0 to a value of 1.

12. The pre-processing method of claim 7 further comprising storing said image and storing a copy of said image, wherein:
    said summing step comprises fetching the pixels of said one kernel from said image; and
    said stroke strengthening step comprises means for increasing the values of said laterally adjacent pixels in said copy of said image.

13. The pre-processing method of claim 7 wherein said summing step is carried out using original values of said image pixels unchanged by said strengthening step.

14. The pre-processing method of claim 7 wherein said summing step is not repeated for a given one of said kernels upon producing a sum greater than said threshold value.

15. The pre-processing method of claim 14 wherein said strengthening step with said one kernel is followed by a repetition of said summing step with the next one of said kernels.

16. The pre-processing method of claim 15 wherein said summing step is carried out with each one of said set of templates.

17. The pre-processing method of claim 7 wherein said width W equals one pixel.

18. A character image pre-processor which locates and widens thin character strokes in a character image comprising an array of columns and rows of pixels, said pixels characterized by individual values, said values lying within a range including a relative high ON value and a relatively low OFF value, said pre-processor comprising:
    template memory means for storing a set of n templates comprising an array of M columns and N rows of elements $T_{ij}$ where i and j are integers such that $1 \leq i \leq N$ and $1 \leq j \leq M+1$, each template comprising a stripe of width W of high-valued individual template elements in a field of low-valued template elements, the stripe in each of n templates oriented in a corresponding one of n directions;
    template matching means for computing for individual kernels of pixels $P_{ij}$ in said image and for each one of said templates $$S = \sum_{i=1}^{5} \sum_{j=1}^{5} T_{ij} P_{ij};$$

stroke strengthening means responsive whenever S is greater than a threshold value for raising toward said ON value the values of pixels of said character image in said one kernel which are laterally adjacent a line of pixel locations corresponding to the high valued elements in the stripe of said one template.

19. The pre-processor of claim 18 wherein said means for strengthening said pixel values raises values of pixels laterally adjacent each side of said pixel locations corresponding to said stripe whereby to generate a widened character stroke centered with respect to a corresponding original character stroke.

20. The pre-processor of claim 18 wherein n=4 and said directions are vertical, horizontal, major diagonal and minor diagonal.

* * * * *